US010902332B2

(12) United States Patent
Chen et al.

(10) Patent No.: US 10,902,332 B2
(45) Date of Patent: Jan. 26, 2021

(54) RECOMMENDATION SYSTEM CONSTRUCTION METHOD AND APPARATUS

(71) Applicant: Advanced New Technologies Co., Ltd., Grand Cayman (KY)

(72) Inventors: Chaochao Chen, Zhejiang (CN); Jun Zhou, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/725,589

(22) Filed: Dec. 23, 2019

(65) Prior Publication Data

US 2020/0134490 A1    Apr. 30, 2020

Related U.S. Application Data

(63) Continuation of application No. 16/290,208, filed on Mar. 1, 2019.

(30) Foreign Application Priority Data

Mar. 2, 2018    (CN) .......................... 2018 1 0174727

(51) Int. Cl.
*G06F 15/18*    (2006.01)
*G06N 5/04*    (2006.01)
(Continued)

(52) U.S. Cl.
CPC .............. *G06N 5/04* (2013.01); *G06N 5/022* (2013.01); *G06N 20/00* (2019.01); *G06Q 30/02* (2013.01);
(Continued)

(58) Field of Classification Search
CPC .......... G06N 20/00; G06N 5/022; G06N 5/04; G06Q 30/02; G06Q 30/0269; G06Q 30/0631
See application file for complete search history.

(56) References Cited

U.S. PATENT DOCUMENTS 7,685,232 B2    3/2010  Gibbs et al.
9,110,955 B1*   8/2015  Bernhardsson ... G06F 16/24578
(Continued)

FOREIGN PATENT DOCUMENTS

CN    106846106    6/2017
TW    201248534    12/2012
(Continued)

OTHER PUBLICATIONS

"Asynchronous Distributed Matrix Factorization with Similar User and Item Based Regularization" Bikash Joshi | Franck Iutzeler | Massih-Reza Amini (Year: 2016).*
(Continued)

*Primary Examiner* — Luis A Sitiriche
(74) *Attorney, Agent, or Firm* — Fish & Richardson P.C.

(57) ABSTRACT

A client device determines a local user gradient value based on a current user preference vector and a local item gradient value based on a current item feature vector. The client device updates a user preference vector by using the local user gradient value and updates an item feature vector by using the local item gradient value. The client device determines a neighboring client device based on a predetermined adjacency relationship. The local item gradient value is sent by the client device to the neighboring client device. The client device receives a neighboring item gradient value sent by the neighboring client device. The client device updates the item feature vector by using the neighboring item gradient value. In response to the client device determining that a predetermined iteration stop condition is satisfied, the
(Continued)

client device outputs the user preference vector and the item feature vector.

17 Claims, 7 Drawing Sheets

(51) Int. Cl.
    *G06N 20/00*        (2019.01)
    *G06Q 30/06*        (2012.01)
    *G06N 5/02*         (2006.01)
    *G06Q 30/02*        (2012.01)

(52) U.S. Cl.
    CPC ..... *G06Q 30/0269* (2013.01); *G06Q 30/0631* (2013.01)

(56) References Cited

U.S. PATENT DOCUMENTS

| | | |
|---|---|---|
| 2015/0324690 A1 | 11/2015 | Chilimbi et al. |
| 2018/0300042 A1* | 10/2018 | Clediere ............... G06F 3/0488 |
| 2019/0272472 A1 | 9/2019 | Chen et al. |
| 2020/0134490 A1 | 4/2020 | Chen et al. |

FOREIGN PATENT DOCUMENTS

| | | |
|---|---|---|
| TW | 201441961 | 11/2014 |
| WO | WO 2012013996 | 2/2012 |
| WO | WO 2017178870 | 10/2017 |

OTHER PUBLICATIONS

Chen, et al., "Privacy preserving point-of-interest recommendation using decentralized matrix factorization," AAAI-18, 2018, 8 pages.

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/US2019/020288, dated May 22, 2019, 16 pages.

McMahan et al., "Federated Learning of Deep Networks using Model Averaging," Cornell University Library, Ithaca NY, 2016, 11 pages.

McMahan et al., Google AI Blog [online], "Federated Learning : Collaborative Machine Learning without Centralized Training Data," Apr. 2017, [retrieved on Oct. 19, 2018], retrieved from: URL<https://ai.googleblog.com/2017/04/federated-learning-collaborative.html>, 7 pages.

Nakamoto, "Bitcoin: A Peer-to-Peer Electronic Cash System," www.bitcoin.org, 2005, 9 pages.

PCT Written Opinion of the International Preliminary Examining Authority in International Appln. No. PCT/US2019/020288, dated Jan. 29, 2020, 8 pages.

Xie et al., "Distributed Machine Learning via Sufficient Factor Broadcasting," Carnegie Mellon University, Department of EECS, Syracuse University, Institute for Infocomm Research, Nov. 2015, 15 pages.

Zhang et al., "Poseidon: A System Architecture for Efficient GPU-based Deep Learning on Multiple Machines," Carnegie Mellon University, Seoul National University, Institute for Infocomm Research, Dec. 2015, 14 pages.

Xeng et al., "IoT Communication Technology," Apr. 30, 2014, pp. 185-186 (full machine translation).

International Preliminary Report on Patentability in International Application No. PCT/US2019/020288, dated Jun. 18, 2020, 9 pages.

\* cited by examiner

RECOMMENDATION SYSTEM CONSTRUCTION METHOD AND APPARATUS

CROSS-REFERENCE TO RELATED APPLICATIONS

This application is a continuation of U.S. patent application Ser. No. 16/290,208, filed Mar. 1, 2019, which claims priority to Chinese Patent Application No. 201810174727.X, filed on Mar. 2, 2018, which is hereby incorporated by reference in its entirety.

TECHNICAL FIELD

Implementations of the present specification relate to the field of big data processing technologies, and in particular, to a recommendation system construction method and apparatus.

BACKGROUND

In the era of big data, training samples can be formed by mining mass data, and through training, data models in various forms can be obtained. In the existing technology, a common implementation solution is to store training samples together at a server and perform model training at the server. The centralized training mode has at least the following disadvantages:

A conventional data model training method cannot meet privacy protection demands: First, user's private data needs to be uploaded to the server for centralized processing, and this is very sensitive to some users. Even if the server does not actively abuse or disclose user privacy, there is still a danger that the server can be attacked and consequently data can be leaked in batches.

In addition, a large number of storage and computing resources are needed for big data model training. With the development of machine learning technologies, both the quantity of data and the complexity of models used for the training are increasing. Thus, it will be more difficult to meet big data model training demands only by improving server's performance or increasing the quantity of servers.

SUMMARY

To alleviate the technical problems, implementations of the present specification provide a recommendation system construction method and apparatus. The technical solutions are described below.

A recommendation system construction method is provided, applied to a system that includes a plurality of users, where a client of any user stores score information of the user for an item, a user preference vector of the user, and an item feature vector, and a plurality of clients implement matrix decomposition through collaborative training. The method includes: performing iterative processing at any client by using the following steps until a predetermined iteration stop condition is satisfied: calculating a local user gradient value based on a current user preference vector, and calculating a local item gradient value based on a current item feature vector; updating the user preference vector by using the local user gradient value, and updating the item feature vector by using the local item gradient value; sending the local item gradient value to a neighboring client based on a predetermined adjacency relationship; receiving a neighboring item gradient value sent by the neighboring client, where the neighboring item gradient value is a local item gradient value of the neighboring client calculated at the neighboring client; updating the item feature vector by using the received neighboring item gradient value; and outputting the latest user preference vector and the latest item feature vector after the iteration ends.

A recommendation system construction apparatus is provided, applied to a system that includes a plurality of users, where the apparatus is disposed at a client of any user, and is configured to store score information of users for items, user preference vectors of users, and item feature vectors, and a plurality of clients implement matrix decomposition through collaborative training, where the apparatus implements iterative processing by using the following modules until a predetermined iteration stop condition is satisfied: a local gradient value calculation module, configured to calculate a local user gradient value based on a current user preference vector, and calculate a local item gradient value based on a current item feature vector; a first updating module, configured to update the user preference vector by using the local user gradient value, and update the item feature vector by using the local item gradient value; a collaborative information sending module, configured to send the local item gradient value to a neighboring client based on a predetermined adjacency relationship; a collaborative information receiving module, configured to receive a neighboring item gradient value sent by the neighboring client, where the neighboring item gradient value is a local item gradient value of the neighboring client calculated at the neighboring client; a second updating module, configured to update the item feature vector by using the received neighboring item gradient value; and an output module, configured to output the latest user preference vector and the latest item feature vector after the iteration ends.

According to the technical solutions provided in the implementations of the present specification, in a recommendation system construction phase and a recommendation system implementation phase, data related to user privacy can be locally stored only at a client, and is not uploaded to a server or propagated to another client, thereby effectively improving privacy and security of user data. In addition, in a training process, each client is used as a distributed computing node, so that a problem that centralized training depends on processing performance of the server can be effectively alleviated. Further, because each client can perform respective training in parallel, overall training efficiency can be improved.

It should be understood that the previous general description and the following detailed description are merely examples and explanations, and cannot limit the implementations of the present specification.

In addition, any one of the implementations of the present specification is not needed to achieve all of the previous effects.

BRIEF DESCRIPTION OF DRAWINGS

To describe the technical solutions in the implementations of the present specification or in the existing technology more clearly, the following briefly introduces the accompanying drawings needed for describing the implementations or the existing technology. Apparently, the accompanying drawings in the following description show merely some implementations of in the implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification shall fall within the protection scope.

A recommendation system (RS) can be used to recommend a user an item that satisfies a demand of the user. The "item" here is in a broad meaning, and can correspond to different actual meanings in different application scenarios. For example, an item can a merchandise, a piece of news, a song, a restaurant, or another user. Scoring data of the user for the item is most important in the recommendation system, and a data form is shown in the following table:

TABLE 1

|        | Item 1 | Item 2 | Item 3 | Item 4 |
|--------|--------|--------|--------|--------|
| User 1 | 1      | 0.6    | —      | 0.2    |
| User 2 | 0.8    | —      | —      | 0.2    |
| User 3 | 0.2    | 0.2    | —      | 1      |
| User 4 | 0.2    | —      | —      | 0.8    |
| User 5 | —      | 0.2    | 1      | 0.8    |

As shown in Table 1, User 1 to User 5 represent five users, and Item 1 to Item 4 represent four items. As such, a user-item score matrix is formed, and the matrix is described as R. Any element $r_{ij}$ represents a score given by the $i^{th}$ user to the $j^{th}$ item, and the score table represents a preference degree of the user to the item, and can be obtained from a behavior history (such as click and purchase) of the user for the item. In Table 1, normalization processing is performed on scores, and the scores are mapped to an interval [0, 1]; and "—" represents that the score that corresponds to $r_{ij}$ and that is given by the user i to the item j cannot be obtained. In the recommendation system, an issue is to predict $r_{ij}$ missing in the score matrix.

Matrix decomposition is to decompose one matrix into a product of two or more matrices. For the previous score matrix, assuming that a total quantity of users is I, and a total quantity of items is J, the matrix R can be denoted as $R_{I \times J}$. Based on matrix multiplication, $R_{I \times J}$ can be decomposed into a product of two matrices:

$$R_{I \times J} = U_{I \times K} \times V_{K \times J} \qquad (1)$$

The value K can be understood as K dimensions used to describe K features of one item (the K features do not necessarily correspond to actual meanings). Therefore:

The matrix $U_{I \times K}$ includes I K-dimensional vectors $U_i$, and any $U_i$ represents a preference vector of the user i for K; the matrix $V_{K \times J}$ includes J K-dimensional vectors $V_j$, and any $V_j$ represents a feature vector of the item j for K.

When $U_i$ and $V_j$ are known, a value of $r_{ij}$ can be calculated by using the following equation:

$$r_{ij} = U_i^T V_j \qquad (2)$$

It can be seen that if each element in the two matrices $U_{I \times K}$ and $V_{K \times J}$ can be solved, any value of $r_{ij}$ in the matrix R can be calculated. It means that a recommendation system that can calculate any "user i-item j" is constructed. Because some values of $r_{ij}$ are known, the solving issue can be translated into a machine learning issue: the two matrices $U_{I \times K}$ and $V_{K \times J}$ are initialized, values of the element values of the two matrices are updated through iterative training and when a product of the updated $U_{I \times K}$ and $V_{K \times J}$ can restore $R_{I \times J}$ (in other words, is close enough to $R_{I \times J}$), it can be considered that the solving task is completed.

Figure 1:
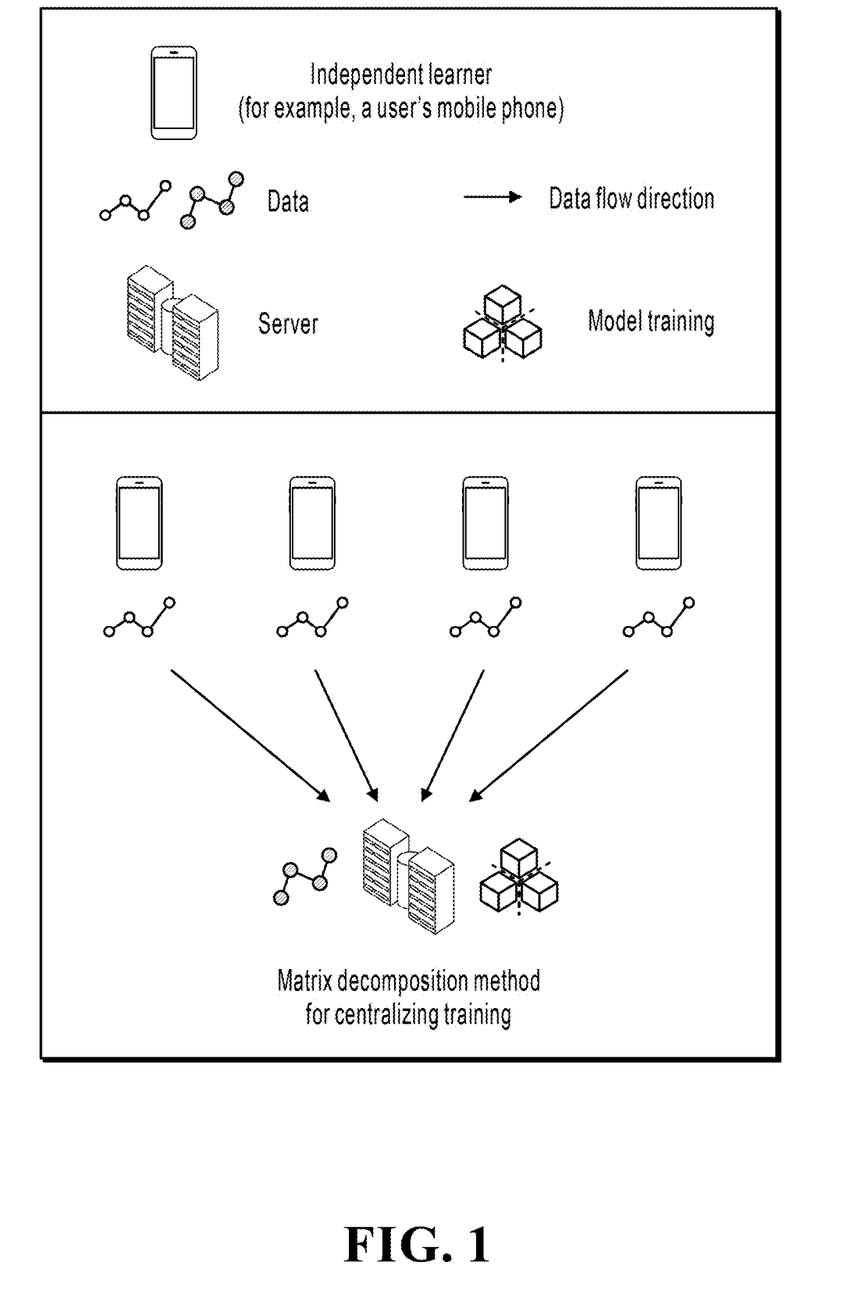
FIG. 1 is a schematic architectural diagram illustrating a centralized matrix decomposition system.

An available solution is implementing matrix decomposition through centralized training: A server first obtains all known values of $r_{ij}$ from users to form a complete matrix $R_{I \times J}$ ("complete" here means that all known element values are included, but the matrix is still sparse), then performs uniform iterative processing, and stores eventually obtained $U_{I \times K}$ and $V_{K \times J}$. For a schematic architectural diagram of the solution, refer to FIG. 1.

In the previous solution, known $r_{ij}$ and $U_i$ of each user i are actually personal data of the user i. For a purpose of privacy protection, the user does not want to upload the data to the server. If the data is leaked in batches because the server is attacked, severe losses are caused. In addition, in actual applications, both the total quantity I of users and the total quantity J of items are very large, and it imposes a very high requirement on the processing capability of the server.

Figure 2:
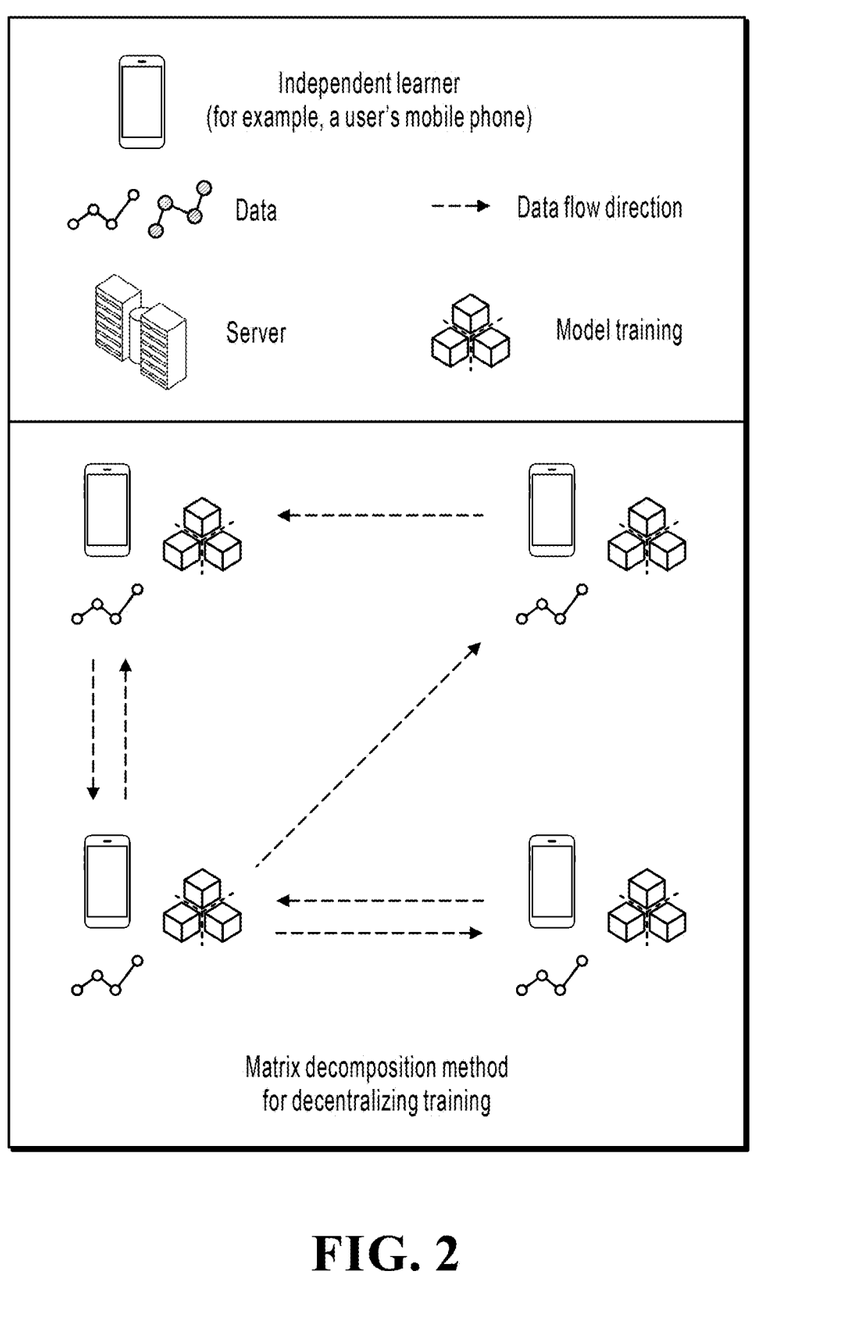
FIG. 2 is a schematic architectural diagram illustrating a distributed matrix decomposition system.

To alleviate the previous problem, another available solution is implementing matrix decomposition through distributed training: Each user i performs training at his client to obtain his $U_i$ and $V_j$. In the whole training process, $r_{ij}$ and $U_i$ that include privacy information can be always locally stored at the client, and does not need to be uploaded to the server or sent to another device, thereby effectively ensuring data privacy. In addition, because the whole training process does not need the server, it is a decentralized training solution in essence. For a schematic architectural diagram of the solution, refer to FIG. 2.

In the distributed training solution, each client is equivalent to a computing node, and for any user i, data that needs to be locally stored at the client includes: a known score $r_{ij}$ given by the user to the item j, where j=1, 2, . . . J; a user preference vector $U_i$ of the user; and an item feature vector $V_j^i$, where j=1, 2, . . . J.

It is worthwhile to note here that although the item feature vector $V_j$ is irrelevant to the user in theory, clients perform training by using different data in the distributed training solution, and therefore item feature vectors obtained by the clients are different. Therefore, a superscript i is used to distinguish between $V_j$ stored at different clients, and it is denoted as "$V_j^i$". Therefore, the following relationship exists for any user i:

$$r_{ij} = U_i^T V_j^i \quad (3)$$

By comparing equation (3) with equation (2), it can be seen that distinguishing processing is performed on $V_j$ of different users in the distributed training solution. For the user i, $V_j^i$ is not private data, but $V_j^i$ obtained after each updating includes information learned from local data of the user i. Therefore, in the training process, different users can exchange information by using $V_j^i$, so that clients can learn from each other without propagating private data. The following describes the training process in detail.

In the training process, a training result needs to be evaluated by using a loss function (also referred to as a cost function or an objective function), the loss function can be represented by $L(U_i, V_j)$ and $L(U_i, V_j)$ is a function of $U_i^T V_j$ and $r_{ij}$, namely, $$L(U_i, V_j^i) = L(U_i^T V_j^i, r_{ij}) \quad (4)$$

Generally, $L(U_i, V_j)$ is a function used to represent a difference between a predicted value $U_i^T V_j$ and a label value $r_{ij}$, and a smaller value of $L(U_i, V_j^i)$ indicates a better fitting effect of $U_i^T V_j^i$ for known $r_{ij}$ (a value of the loss function is 0 in an ideal case). Therefore, the training process can be understood as a process of "searching for a group of $U_i$ and $V_j^i$, to minimize the loss function $L(U_i, V_j^i)$". In actual applications, the loss function may be in many forms such as a mean square function, a cross entropy function, and a hinge loss function. In the present specification, a specific form of the loss function is not limited.

To identify a minimum value of a loss function J(w), a gradient descent method is usually used, to be specific, $$U_i \leftarrow U_i - \alpha \frac{\partial L}{\partial U_i} \quad (5)$$

$$V_j^i \leftarrow V_j^i - \alpha \frac{\partial L}{\partial V_j^i} \quad (6)$$

Iterative updating is performed on $U_i$ and $V_j^i$ based on the previous updating equations until a group of $U_i$ and $V_j^i$ that make the loss function $L(U_i, V_j^i)$ minimum (or small enough) are identified. $\alpha$ is a determined learning rate, $$\frac{\partial L}{\partial U_i}$$

is a user gradient value in the loss function, and $$\frac{\partial L}{\partial V_j^i}$$

is an item gradient value in the loss function.

In the distributed training solution, to enable the clients to learn from each other, after obtaining an item gradient value, each client sends the item gradient value to another user, and also receives an item gradient value sent by another user. Further, each user continues to update the item feature vector by using the item gradient value sent by another user.

Assuming that there are a user $i_1$ and a user $i_2$, after obtaining $$\frac{\partial L}{\partial V_j^{i_1}},$$

the user $i_1$ sends $$\frac{\partial L}{\partial V_j^{i_1}}$$

to the user $i_2$, and after receiving $$\frac{\partial L}{\partial V_j^{i_1}},$$

the user $i_2$ continues to use the gradient descent method to update $V_j^{i_2}$:

$$V_j^{i_2} \leftarrow V_j^{i_2} - \alpha \frac{\partial L}{\partial V_j^{i_1}} \quad (7)$$

It can be seen from equations (5), (6), and (7) that a client of each user i is used as a computing node, uses only data of the client when updating $U_i$, and uses both the data of the client and data sent by another node when updating $V_j^i$. Generally, the clients collaborate to complete the training. In the training process, only an item gradient value is propagated between different clients. As such, privacy disclosure is not caused, and the clients can learn learning results from each other.

In the training process, any two clients can collaborate with each other in theory. Therefore, the collaboration solution can also be designed flexibly as needed. Examples are given below.

Global collaboration: If there are totally I users, any user i can send his item gradient value to other (I−1) users, and also receives item gradient values sent by other (I−1) users.

Group collaboration: I users are classified into several user groups based on a certain rule, and training is performed in each user group through the previous global collaboration. The grouping can be based on user attributes such as user geographical location, user gender, and user age. This is not limited in the present specification.

Adjacency cooperation: Any user i collaborates with only adjacent N other users. "Adjacent" here is a broad concept, and can be determined based on an actual user geographic location distance, or can be determined based on a certain logical distance, for example, communication costs between clients, user number relevance, and user attribute similarity. N can be a fixed value such as 2, or can be a value dynamically determined based on a distance threshold, for example, all users whose distance from the user i falls within a certain threshold.

Based on the big data training idea, a sequence of updating performed by using different data does not affect the training result in general. Therefore, for a propagation path, any user $i_1$ and any user $i_2$ can propagate the latest item gradient value, or can set the propagation path to be unidirectional. A specific form of the propagation path can be mesh-shaped, ring-shaped, star-shaped, etc. This is not limited in the present specification.

For data use, if any user i can receive item gradients sent by a plurality of other users, the user can use the item gradients of all other users for an updating operation, or can use some item gradient values for an updating operation. For example, a special case can be as follows: In each round of iteration, an item gradient value of a user can be randomly selected for the updating operation, and the idea is similar to that of a stochastic gradient descent method. Alternatively, another updating policy can be used. For example, n (n<N) item gradient values that are received first are used for the updating operation, and item gradient values sent by one or more other users are selected based on a predetermined polling policy for the updating operation.

The following describes the solutions in the present implementation of the present specification with reference to a specific example.

Assuming that in an merchandise recommendation system, scores given by some users to some merchandise can be obtained based on historical behavior of a user, for example, click or purchase, a score given by the user i to the item j is represented by $r_{ij}$, and a score interval is [0,1]. The score matrix is sparse, and only a part of $r_{ij}$ is known usually. The training objective is to construct a recommendation system that can predict unknown values.

In a decentralized matrix decomposition method, both data and a model are stored on a device such as a PC or a mobile phone, and are not uploaded to the server. Data that needs to be locally stored at a client of any user i includes: a known score $r_{ij}$ given by the user to the item j, where j=1, 2, . . . J; a user preference vector $U_i$ of the user; and an item feature vector $V_j^i$, where j=1, 2, . . . J; and both $U_i$ and $V_j$ are real number vectors, and fall within [−1, 1], namely, $U_i, V_j^i \in [-1,1]^K$, and K is a vector dimension for matrix decomposition.

The loss function is described as follows:

$$L = \Sigma_{u_i \in u, v_j^i \in v}(r_{ij} - U_i^T V_j^i)^2 + \lambda(\Sigma_{u_i \in u}\|U_i\|^2 + \Sigma_{u_i \in u}\Sigma_{v_j^i \in v}\|V_j^i\|^2) \quad (7)$$

The evaluation function can include two parts: The first part is a mean square error, and the second part is a regularization item, where λ is a restraint coefficient. It can be seen from the loss function that if the function needs to be minimized, the regularization item needs to be small enough, and when a value of λ is relatively large, each parameter value needs to be small enough. Actually, a smaller parameter value usually corresponds to a smoother function, namely, a simpler function. As such, an overfitting problem will not easily occur.

Derivation is separately performed on $U_i$ and $V_j^i$ based on equation (7), to obtain a user gradient and an item gradient of the evaluation function:

$$\frac{\partial L}{\partial U_i} = (U_i^T V_j^i - R_{ij})V_j^i + \lambda U_i \quad (8)$$

$$\frac{\partial L}{\partial V_j^i} = (U_i^T V_j^i - R_{ij})U_i + \lambda V_j^i \quad (9)$$

It is worthwhile to note that there are totally J items. Therefore, for any user i, the two gradients can be represented as vectors, namely, j=1, 2, . . . J.

In the collaborative solution, "N clients closest to a client" are described as neighbors based on a geographic location of the client, and N is a fixed value such as 5 or 10. For any client i, in each round of iteration update, an item gradient value calculated by using local data is sent to the N neighbors, and item gradient values sent by the N neighbors are received.

Figure 3:
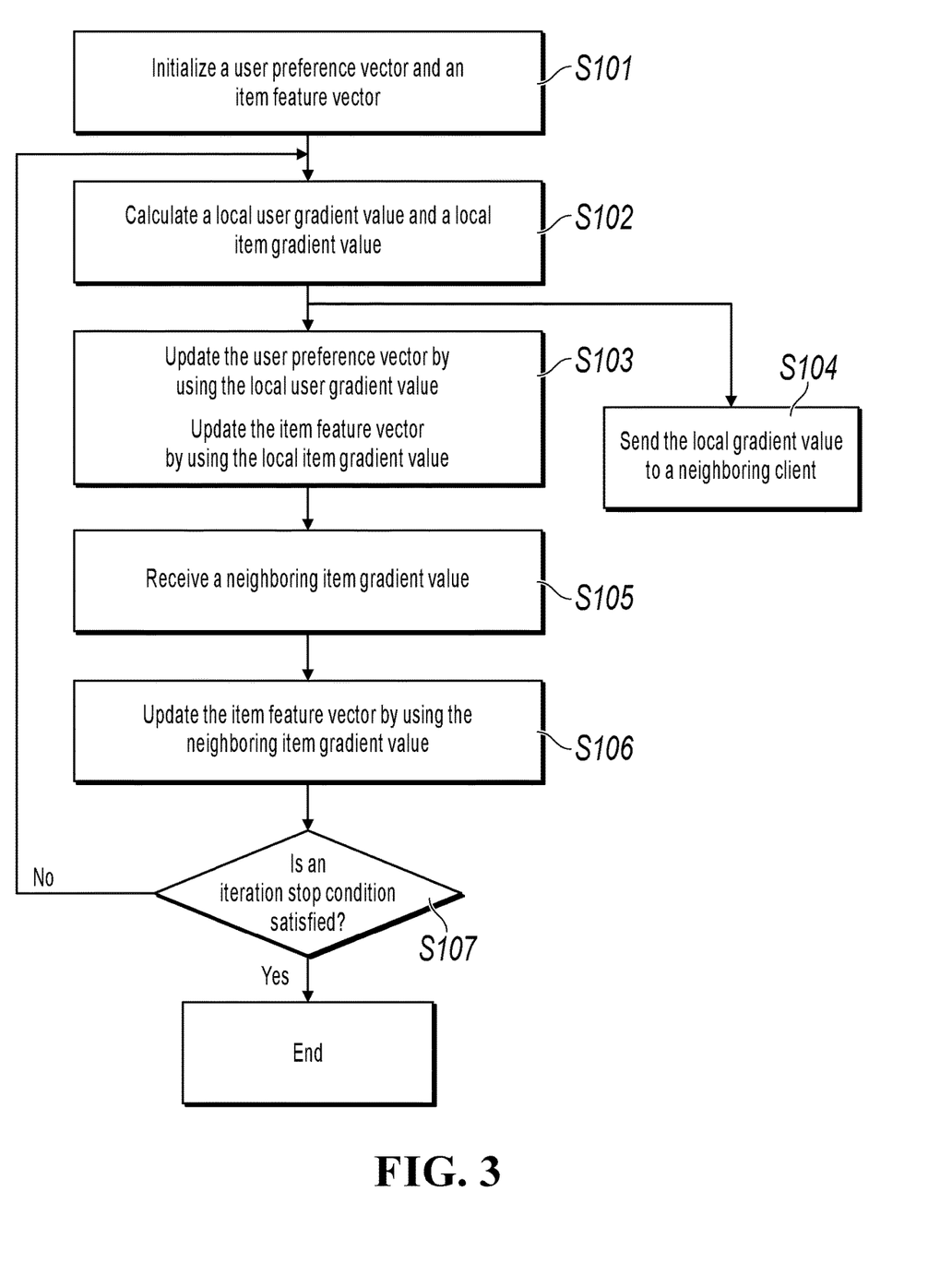
FIG. 3 is a flowchart illustrating a first recommendation system construction method, according to an implementation of the present specification.

The whole training process algorithm is described as follows: input: a known score $r_{ij}$, a learning rate α, user adjacency information, a regularization item parameter λ, and a quantity of iteration times T (optional); and output: $U_i$ and $V_j^i$.

For any user i, the following operations are performed.

S101. Initialize a user preference vector $U_i$ and an item feature vector $V_j^i$.

S102. Calculate a local user gradient value $$\frac{\partial L}{\partial U_i}$$

and a local item gradient value $$\frac{\partial L}{\partial V_j^i}.$$

Calculation is performed based on equations (8) and (9).

S103. Update $U_i$ by using $$\frac{\partial L}{\partial U_i},$$

and update $V_j^i$ by using $$\frac{\partial L}{\partial V_j^i}.$$

Calculation is performed based on equations (5) and (6).

S104. Send the local item gradient value $$\frac{\partial L}{\partial V_j^i}$$

to a neighboring client.

$i_{neighbor}$ represents a neighboring user of the user i, and in the present implement, a quantity of neighbors of each user i is fixed and is N, namely, $i_{neighbor} \in \{1, 2 \ldots, N\}$.

It is worthwhile to note that in the whole training process, a neighboring user of any user i can change dynamically, for example, a neighboring user determined based on a geographical location distance. If a geographical location of the user changes, an adjacency relationship between users can also change. However, it does not affect global training.

S105. Receive a neighboring item gradient value $$\frac{\partial L}{\partial V_j^{i_{neighbor}}}$$

sent by the neighboring client.

Corresponding to S104, the latest gradient values $$\frac{\partial L}{\partial V_j^{i_{neighbor}}}$$

sent by the N neighbors are received in the present implementation.

In actual applications, a neighboring client that receives the local item gradient value in S104 and a neighboring client that sends the neighboring item gradient value in S105 can be a same client set or different client sets.

S106. Update $V_j^i$ by using $$\frac{\partial L}{\partial V_j^{i_{neighbor}}}.$$

Calculation is performed based on equation (7), and in the present implementation, a common gradient descent method is used, to be specific, $V_j^i$ is updated for N times by using the gradient values sent by the N neighbors in each round of iteration.

S107. Determine whether an iteration stop condition is satisfied, and if yes, output the latest $U_i$ and the latest $V_j^i$; or if no, return to S102.

It can be learned from the flowchart provided in FIG. 3 that S102 to S106 are iterative processing steps, and the iteration stop condition here can be reaching a predetermined quantity of iteration times T, or can be satisfying a certain convergence condition, for example, a loss function value is small enough, or results of two iterations are close enough. Actual quantities of iteration times of different clients can be the same or different. This is not limited in the present specification.

Figure 4:
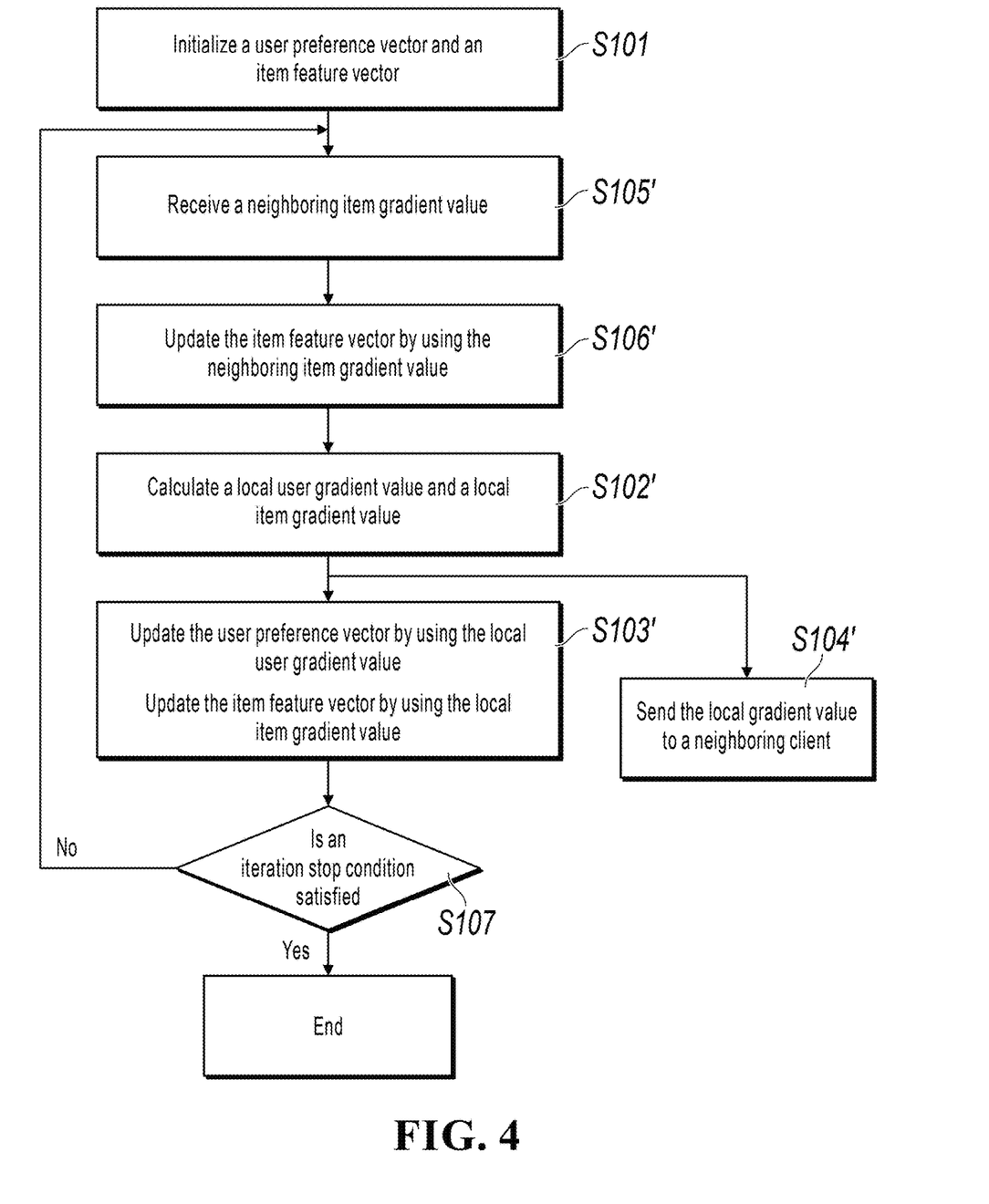
FIG. 4 is a flowchart illustrating a second recommendation system construction method, according to an implementation of the present specification.

It can be understood that based on the big data training idea, a sequence of updating performed by using different data does not affect the training result in general. In S102 and S103 and in S105 and S106, updating is performed by using different data. Therefore, a sequence of the two operations does not need to be limited. For example, as shown in FIG. 4, in each round of iteration, updating can be first performed by using the neighboring gradient value (which can be received in a previous round of iteration), and then updating is performed by using the local gradient value.

Based on the training, obtaining $U_i$ and $V_j^i$ of any user i means that a recommendation system for the user i is completed, and if an unknown "user i-item j" score needs to be predicted, calculation can be performed based on equation (3). Assuming that K is equal to 3, a certain user preference vector obtained through training is [−0.23, 0.89, 0.22], and a certain item feature vector is [−0.03, 0.56, −0.12], a score given by the user to the item is a predicted value: 0.4789. Because both $U_i$ and $V_j^i$ are locally stored at the client, the prediction calculation process does not depend on the server.

It can be seen that by using the previous solutions, in a recommendation system construction phase and a recommendation system implementation phase, data related to user privacy can be locally stored only at a client, and is not uploaded to a server or propagated to another client, thereby effectively improving privacy and security of user data. In addition, in a training process, each client is used as a distributed computing node, so that a problem that centralized training depends on processing performance of the server can be effectively alleviated. Further, because each client can perform respective training, overall training efficiency can be improved.

Figure 5:
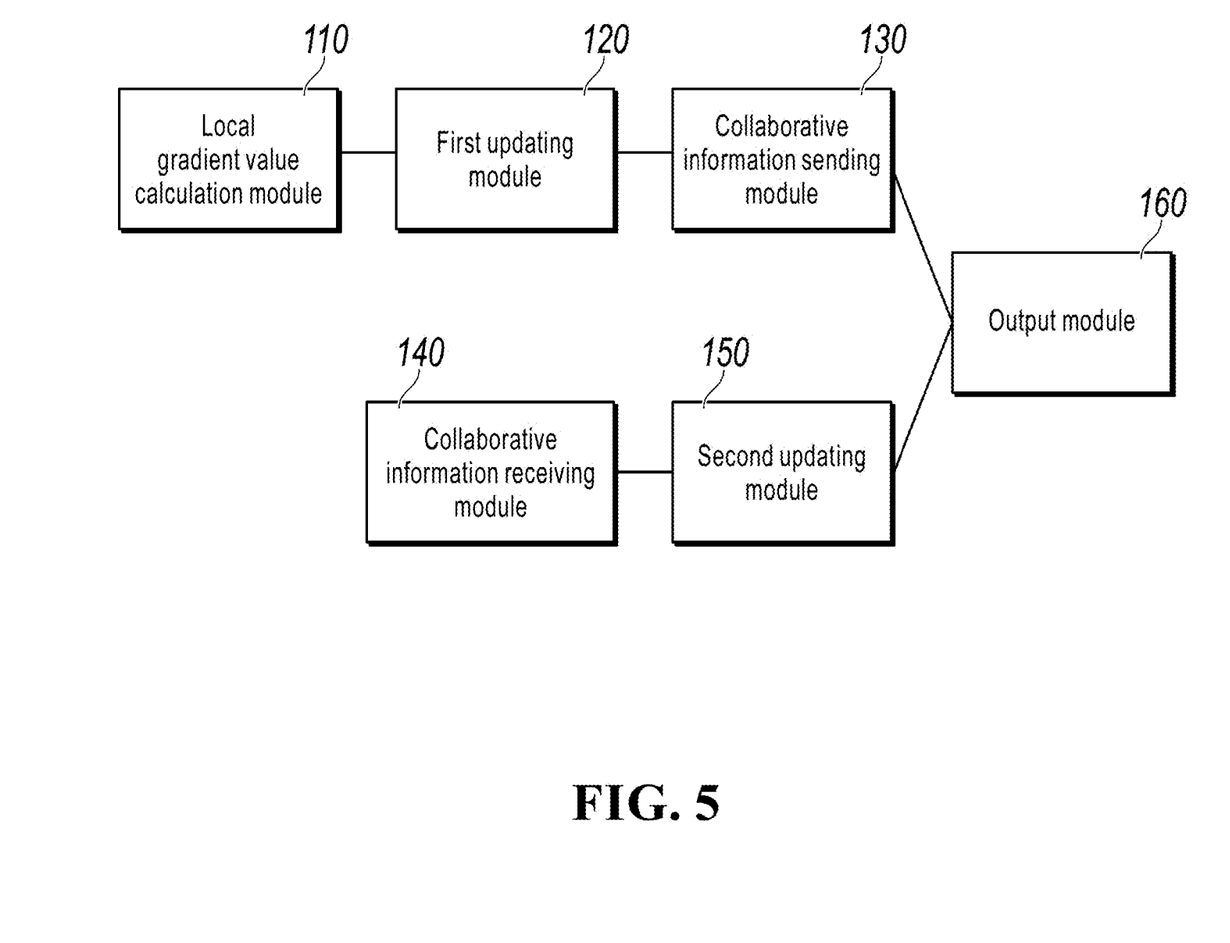
FIG. 5 is a schematic structural diagram illustrating a recommendation system construction apparatus, according to an implementation of the present specification.

Corresponding to the previous method implementation, an implementation of the present specification further provides a matrix decomposition apparatus. The apparatus is disposed at a client of any user, and is configured to store score information of users for items, user preference vectors of users, and item feature vectors, and a plurality of clients implement matrix decomposition through collaborative training.

As shown in FIG. 5, the apparatus implements iterative processing by using the following modules until a predetermined iteration stop condition is satisfied: a local gradient value calculation module 110, configured to calculate a local user gradient value based on a current user preference vector, and calculate a local item gradient value based on a current item feature vector; a first updating module 120, configured to update the user preference vector by using the local user gradient value, and update the item feature vector by using the local item gradient value; a collaborative information sending module 130, configured to send the local item gradient value to a neighboring client based on a predetermined adjacency relationship; a collaborative information receiving module 140, configured to receive a neighboring item gradient value sent by the neighboring client, where the neighboring item gradient value is a local item gradient value of the neighboring client calculated at the neighboring client; a second updating module 150, configured to update the item feature vector by using the received neighboring item gradient value; and an output module 160, configured to output the latest user preference vector and the latest item feature vector after the iteration ends.

According to a specific implementation provided in the present specification, the predetermined adjacency relationship can include an adjacency relationship determined based on a distance between clients, and the distance includes a geographical location distance or a logical distance.

According to a specific implementation provided in the present specification, the neighboring client can be all or some of system clients.

According to a specific implementation provided in the present specification, in any round of iteration, when a plurality of neighboring item gradient values are received, the second updating module 150 can update the item feature vector by using all or some of the plurality of neighboring item gradient values.

According to a specific implementation provided in the present specification, a neighboring client that receives the local item gradient value and a neighboring client that sends the neighboring item gradient value are a same client set or different client sets.

An implementation of the present specification further provides a matrix decomposition system including a plurality of clients that the previous matrix decomposition apparatus is disposed at.

An implementation of the present specification further provides a computer device, including at least a memory, a processor, and a computer program that is stored on the memory and that can run on the processor. When executing the program, the processor implements the previous matrix decomposition method. The method at least includes: a matrix decomposition method, where a client of any user stores score information of the user for an item, a user preference vector of the user, and an item feature vector, and a plurality of clients implement matrix decomposition through collaborative training; and the method includes: performing iterative processing at any client by using the following steps until a predetermined iteration stop condition is satisfied: calculating a local user gradient value based on a current user preference vector, and calculating a local item gradient value based on a current item feature vector; updating the user preference vector by using the local user gradient value, and updating the item feature vector by using the local item gradient value; sending the local item gradient value to a neighboring client based on a predetermined adjacency relationship; receiving a neighboring item gradient value sent by the neighboring client, where the neighboring item gradient value is a local item gradient value of the neighboring client calculated at the neighboring client; updating the item feature vector by using the received neighboring item gradient value; and outputting the latest user preference vector and the latest item feature vector after the iteration ends.

Figure 6:
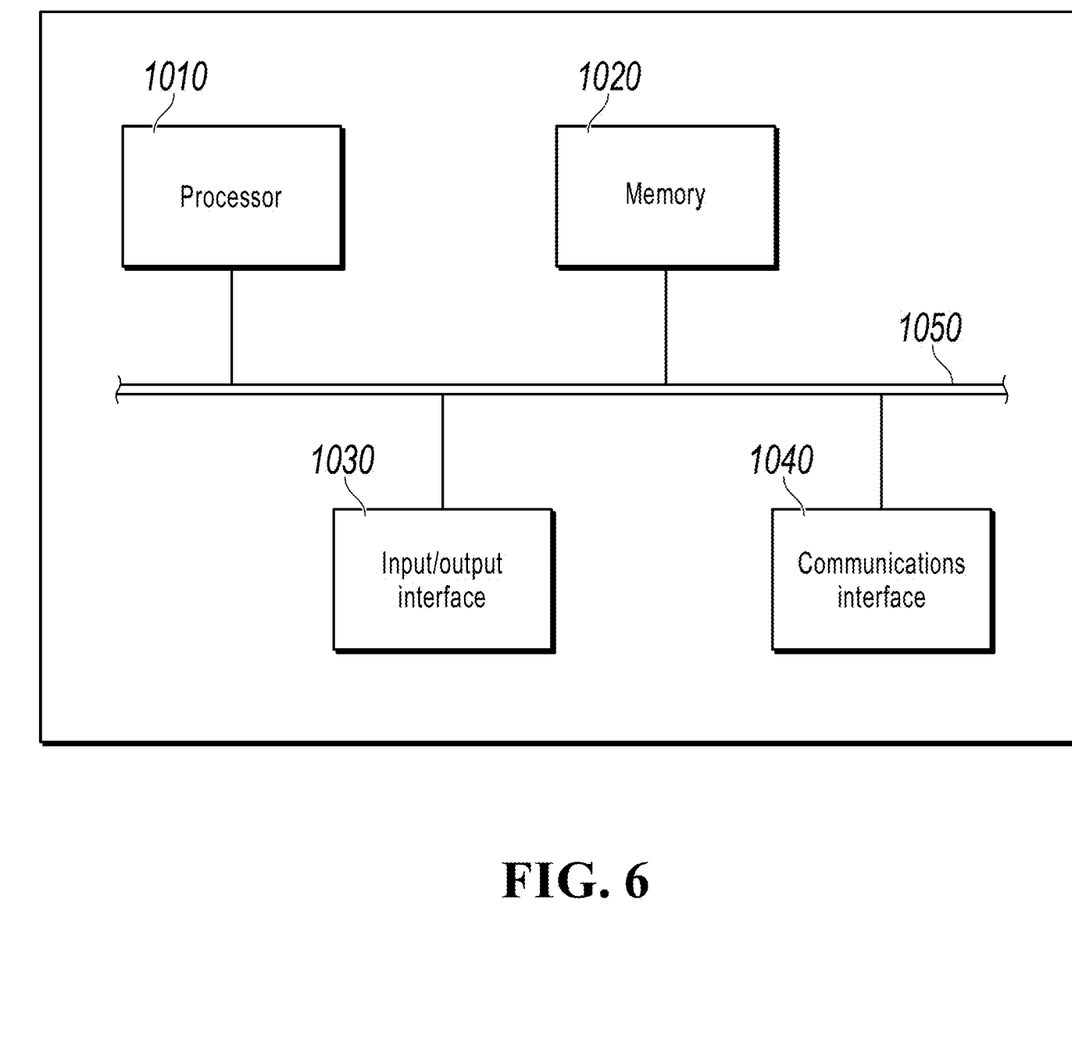
FIG. 6 is a schematic structural diagram illustrating a configuration of an apparatus, according to an implementation of the present specification.

FIG. 6 is a schematic diagram illustrating a more specific hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 implement mutual communication and connection in the device by using the bus 1050.

The processor 1010 can be implemented by using a general-purpose central processing unit (CPU), a microprocessor, an application-specific integrated circuit (ASIC), one or more integrated circuits, etc., to execute a related program to implement the technical solutions provided in the present implementation of the present specification.

The memory 1020 can be implemented by using a read-only memory (ROM), a random access memory (RAM), a static storage device, a dynamic storage device, etc. The memory 1020 can store an operating system and other application programs, and when the technical solutions provided in the present implementation of the present specification are implemented by using software or firmware, related program code is stored in the memory 1020, and is invoked by the processor 1010.

The input/output interface 1030 is configured to connect an input/output module to implement information input and output. The input/output module can be deployed in the device as a component (which is not shown in the figure), or can be connected to the device as an external component to provide a corresponding function. An input device can include a keyboard, a mouse, a touchscreen, a microphone, various sensors, etc., and an output device can include a display, a loudspeaker, a vibrator, an indicator, etc.

The communications interface 1040 is configured to connect a communications module (which is not shown in the figure) to implement communication and interaction between the device and another device. The communications module can implement communication in a wired method (such as a USB or a network cable) or a wireless method (such as a mobile network, Wi-Fi, or Bluetooth).

The bus 1050 includes a channel, and transmits information between components (such as the processor 1010, the memory 1020, the input/output interface 1030, and the communications interface 1040) of the device.

It is worthwhile to note that, although the processor 1010, the memory 1020, the input/output interface 1030, the communications interface 1040, and the bus 1050 are shown in the previous device, in a specific implementation process, the device can further include another component necessary for implementing normal running. In addition, a person skilled in the art can understand that the previous device can include only components necessary for implementing the solutions in the present implementation of the present specification, and does not need to include all components shown in the figure.

An implementation of the present specification further provides a computer readable storage medium that stores a computer program, and when the program is executed by a processor, the previous matrix decomposition method is implemented. The method at least includes: a matrix decomposition method, where a client of any user stores score information of the user for an item, a user preference vector of the user, and an item feature vector, and a plurality of clients implement matrix decomposition through collaborative training; and the method includes: performing iterative processing at any client by using the following steps until a predetermined iteration stop condition is satisfied: calculating a local user gradient value based on a current user preference vector, and calculating a local item gradient value based on a current item feature vector; updating the user preference vector by using the local user gradient value, and updating the item feature vector by using the local item gradient value; sending the local item gradient value to a neighboring client based on a predetermined adjacency relationship; receiving a neighboring item gradient value sent by the neighboring client, where the neighboring item gradient value is a local item gradient value of the neighboring client calculated at the neighboring client; updating the item feature vector by using the received neighboring item gradient value; and outputting the latest user preference vector and the latest item feature vector after the iteration ends.

The computer readable medium includes persistent, non-persistent, movable, and unmovable media that may implement information storage by using any method or technology. Information may be a computer readable instruction, a data structure, a program module, or other data. Examples of a computer storage medium include but are not limited to a phase change memory (PCM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage or another magnetic storage device, and any other non-transmission medium. The computer storage medium can be used to store information that can be accessed by the computing device. As described in the present specification, the computer readable medium does not include a transitory computer readable media (transitory media) such as a modulated data signal and carrier.

It can be learned from the description of the implementations that a person skilled in the art can clearly understand that the implementations of the present specification can be implemented by using software in addition to a necessary universal hardware platform. Based on such an understanding, the technical solutions in the implementations of the present specification essentially, or the part contributing to the existing technology can be implemented in the form of a software product. The computer software product can be stored in a storage medium, such as a ROM/RAM, a magnetic disk, or an optical disc, and includes several instructions for instructing a computer device (which can be a personal computer, a server, or a network device) to perform the methods described in the implementations or some parts in the implementations of the present specification.

The system, apparatus, or unit described in the implementations can be implemented by a computer chip or an entity, or can be implemented by a product having a certain function. A typical implementation device is a computer, and the computer can be a personal computer, a laptop computer, a cellular phone, a camera phone, a smart phone, a personal digital assistant, a media player, a navigation device, an e-mail receiving and sending device, a game console, a tablet computer, a wearable device, or a combination of any one of these devices.

The implementations in the present specification are all described in a progressive method, for same or similar parts in the implementations, refer to these implementations, and each implementation focuses on a difference from other implementations. Especially, an apparatus implementation is basically similar to a method implementation, and therefore is described briefly; for related parts, refer to partial descriptions in the method implementation. The apparatus implementation described above is merely an example, and the modules described as separate components can or cannot be physically separate. In implementing the solutions of the implementations of the present specification, functions of the modules can be implemented in one or more pieces of software and/or hardware. Some or all of the modules can be selected based on actual needs to achieve the objectives of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can make several improvements or polishing without departing from the principle of the implementations of the present specification, and the improvements or polishing shall fall within the protection scope of the implementations of the present specification.

Figure 7:
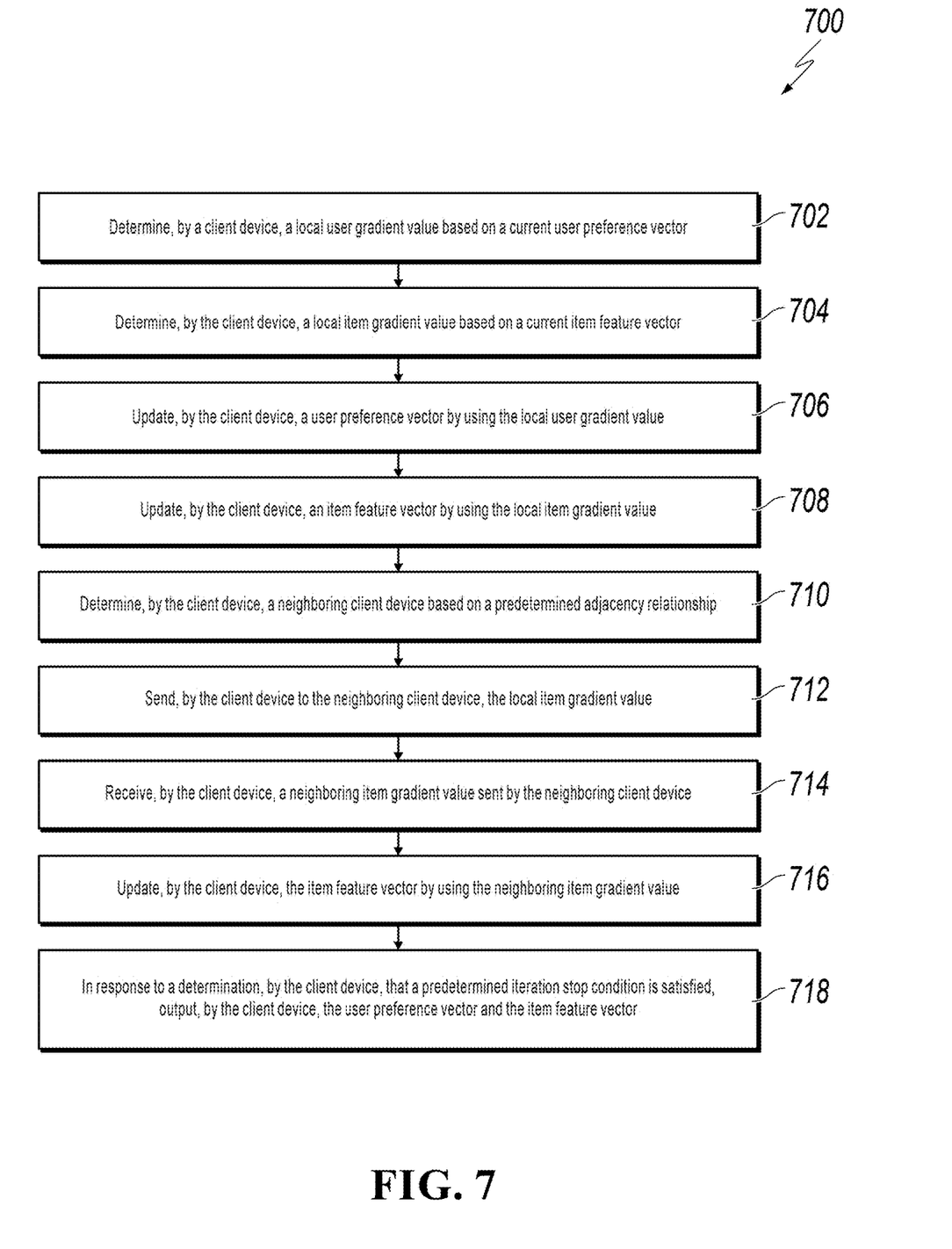
FIG. 7 is a flowchart illustrating an example of a computer-implemented method for generating recommendations, according to an implementation of the present disclosure.

FIG. 7 is a flowchart illustrating an example of a computer-implemented method 700 for generating recommendations, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a client device determines a local user gradient value based on a current user preference vector. From 702, method 700 proceeds to 704.

At 704, a client device determines a local item gradient value based on a current item feature vector. From 704, method 700 proceeds to 706.

At 706, the client device updates a user preference vector by using the local user gradient value. From 706, method 700 proceeds to 708.

At 708, the client device updates an item feature vector by using the local item gradient value. From 708, method 700 proceeds to 710.

At 710, the client device determines a neighboring client device based on a predetermined adjacency relationship. In some implementations, the predetermined adjacency relationship comprises an adjacency relationship determined based on a distance between client devices, and the distance comprises a geographical location distance or a logical distance. In some implementations the neighboring client device comprises one or more client devices in a network. From 710, method 700 proceeds to 712.

At 712, the local item gradient value is sent by the client device to the neighboring client device. From 712, method 700 proceeds to 714.

At 714, the client device receives a neighboring item gradient value sent by the neighboring client device. From 714, method 700 proceeds to 716.

At 716, the client device updates the item feature vector by using the neighboring item gradient value. In some implementations, updating the item feature vector by using the neighboring item gradient value comprises: updating the item feature vector by using all or a portion of a plurality of neighboring item gradient values. From 716, method 700 proceeds to 718.

At 718, in response to the client device determining that a predetermined iteration stop condition is satisfied, the client device outputs the user preference vector and the item feature vector. After 718, method 700 can stop.

In some implementations, method 700 further comprises receiving, by the client device, a trigger to initiate a training process, the client device being configured to store score information of a user for an item, the user preference vector of the user, and the item feature vector, and being configured to implement matrix decomposition through a collaborative training.

In some implementations, the neighboring client device that receives the local item gradient value and a neighboring client device that sends the neighboring item gradient value are in a same client set or in different client sets.

In some implementations, the collaborative training comprises a process of searching for a group of user preference vector and item feature vectors, to minimize a loss function; the loss function is determined based on a mean square error function of the user preference vector and the item feature vectors; the loss function comprises a loss regularization item of the user preference vector and the item feature vectors; or the loss regularization item comprises a restraint coefficient.

The described subject matter can provide one or more technical solutions/effects. For example, in conventional solutions, known $r_{ij}$ and $U_i$ of each user i are actually personal data of the user i. For a purposes of privacy protection, the user does not want to upload the data to the server. If the data is leaked because the server is attacked, severe losses can be caused. Additionally, in actual applications, both the total quantity I of users and the total quantity J of items are very large, which imposes a very high requirement for processing capability of the server.

To alleviate these issues, matrix decomposition through distributed training can be used. Each user i performs training at their client to obtain a $U_i$ and $V_j$. In the training process, $r_{ij}$ and $U_i$, which include privacy information, can be locally stored at the client, and does not need to be uploaded to a server or sent to another device, thereby better ensuring/protecting data privacy. Because the training process does not need the server, it can be considered a decentralized training solution which can provide increased scalability, security, and performance. For example, in the described training process, different users can exchange information by using $V_j^i$, so that clients can learn from each other without propagating private data. Also, as each client is used as a distributed computing node, issues with centralized training depending on processing performance of the server can be effectively alleviated. Further, because each client can perform respective training, overall training efficiency can be improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer implemented method for generating recommendations, the method comprising:
   determining, by a client device, a local user gradient value based on a current user preference vector, wherein the client device is associated with a user in a recommendation system, wherein the current user preference vector is determined by scores that users in the recommendation system assign to items in the recommendation system, wherein each of the scores represents a preference degree that each of the users has toward each of the items, wherein the recommendation system recommends the items to the users based on the scores, and wherein two users in the recommendation system can assign their respective scores to an item in the recommendation system at two different times;
   determining, by the client device, a local item gradient value based on a current item feature vector, wherein the current item feature vector is determined by the scores that the users in the recommendation system assign to the items in the recommendation system;
   updating, by the client device, a user preference vector by using the local user gradient value;
   updating, by the client device, an item feature vector by using the local item gradient value;
   determining, by the client device, a neighboring client device based on a predetermined adjacency relationship, wherein the predetermined adjacency relationship comprises an adjacency relationship determined based on a geographical location distance between client devices;
   sending, by the client device to the neighboring client device, the local item gradient value;
   receiving, by the client device, a neighboring item gradient value sent by the neighboring client device, wherein the neighboring item gradient value is a local item gradient value of the neighboring client device calculated at the neighboring client device;
   updating, by the client device, the item feature vector by using the neighboring item gradient value; and
   in response to determining, by the client device, that a predetermined iteration stop condition is satisfied, wherein each iteration step comprises updating the user preference vector using the local user gradient value, updating the item feature vector using the local item gradient value, and updating the item feature vector using the neighboring item gradient value, outputting, by the client device, recommendations of the items to the users based on the user preference vector and the item feature vector.

2. The computer implemented method of claim 1, further comprising:
   receiving, by the client device, a trigger to initiate a training process, the client device being configured to store score information of a user for an item, the user preference vector of the user, and the item feature vector, and being configured to implement matrix decomposition through a collaborative training.

3. The computer implemented method of claim 2, wherein:
   the collaborative training comprises a process of searching for a group of user preference vector and item feature vectors, to minimize a loss function;
   the loss function is determined based on a mean square error function of the user preference vector and the item feature vectors;
   the loss function comprises a loss regularization item of the user preference vector and the item feature vectors; or
   the loss regularization item comprises a restraint coefficient.

4. The computer implemented method of claim 1, wherein the neighboring client device comprises one or more client devices in a network.

5. The computer implemented method of claim 1, wherein updating the item feature vector by using the neighboring item gradient value comprises:
   updating the item feature vector by using all or a portion of a plurality of neighboring item gradient values.

6. The computer implemented method of claim 1, wherein the neighboring client device that receives the local item gradient value and a neighboring client device that sends the neighboring item gradient value are in a same client set or in different client sets.

7. A non-transitory, computer-readable medium storing one or more instructions executable by a computer system to perform operations comprising:
   determining, by a client device, a local user gradient value based on a current user preference vector, wherein the client device is associated with a user in a recommendation system, wherein the current user preference vector is determined by scores that users in the recommendation system assign to items in the recommendation system, wherein each of the scores represents a preference degree that each of the users has toward each of the items, wherein the recommendation system recommends the items to the users based on the scores, and wherein two users in the recommendation system can assign their respective scores to an item in the recommendation system at two different times;
   determining, by the client device, a local item gradient value based on a current item feature vector, wherein the current item feature vector is determined by the scores that the users in the recommendation system assign to the items in the recommendation system;
   updating, by the client device, a user preference vector by using the local user gradient value;
   updating, by the client device, an item feature vector by using the local item gradient value;
   determining, by the client device, a neighboring client device based on a predetermined adjacency relationship, wherein the predetermined adjacency relationship comprises an adjacency relationship determined based on a geographical location distance between client devices;

sending, by the client device to the neighboring client device, the local item gradient value;

receiving, by the client device, a neighboring item gradient value sent by the neighboring client device, wherein the neighboring item gradient value is a local item gradient value of the neighboring client device calculated at the neighboring client device;

updating, by the client device, the item feature vector by using the neighboring item gradient value; and in response to determining, by the client device, that a predetermined iteration stop condition is satisfied, wherein each iteration step comprises updating the user preference vector using the local user gradient value, updating the item feature vector using the local item gradient value, and updating the item feature vector using the neighboring item gradient value, outputting, by the client device, recommendations of the items to the users based on the user preference vector and the item feature vector.

8. The non-transitory, computer-readable medium of claim 7, further comprising one or more instructions to:
receive, by the client device, a trigger to initiate a training process, the client device being configured to store score information of a user for an item, the user preference vector of the user, and the item feature vector, and being configured to implement matrix decomposition through a collaborative training.

9. The non-transitory, computer-readable medium of claim 8, wherein:
the collaborative training comprises a process of searching for a group of user preference vector and item feature vectors, to minimize a loss function;
the loss function is determined based on a mean square error function of the user preference vector and the item feature vectors;
the loss function comprises a loss regularization item of the user preference vector and the item feature vectors; or
the loss regularization item comprises a restraint coefficient.

10. The non-transitory, computer-readable medium of claim 7, wherein the neighboring client device comprises one or more client devices in a network.

11. The non-transitory, computer-readable medium of claim 7, wherein updating the item feature vector by using the neighboring item gradient value comprises:
updating the item feature vector by using all or a portion of a plurality of neighboring item gradient values.

12. The non-transitory, computer-readable medium of claim 7, wherein the neighboring client device that receives the local item gradient value and a neighboring client device that sends the neighboring item gradient value are in a same client set or in different client sets.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining, by a client device, a local user gradient value based on a current user preference vector, wherein the client device is associated with a user in a recommendation system, wherein the current user preference vector is determined by scores that users in the recommendation system assign to items in the recommendation system, wherein each of the scores represents a preference degree that each of the users has toward each of the items, wherein the recommendation system recommends the items to the users based on the scores, and wherein two users in the recommendation system can assign their respective scores to an item in the recommendation system at two different times;

determining, by the client device, a local item gradient value based on a current item feature vector, wherein the current item feature vector is determined by the scores that the users in the recommendation system assign to the items in the recommendation system;

updating, by the client device, a user preference vector by using the local user gradient value;

updating, by the client device, an item feature vector by using the local item gradient value;

determining, by the client device, a neighboring client device based on a predetermined adjacency relationship, wherein the predetermined adjacency relationship comprises an adjacency relationship determined based on a geographical location distance between client devices;

sending, by the client device to the neighboring client device, the local item gradient value;

receiving, by the client device, a neighboring item gradient value sent by the neighboring client device, wherein the neighboring item gradient value is a local item gradient value of the neighboring client device calculated at the neighboring client device;

updating, by the client device, the item feature vector by using the neighboring item gradient value; and in response to determining, by the client device, that a predetermined iteration stop condition is satisfied, wherein each iteration step comprises updating the user preference vector using the local user gradient value, updating the item feature vector using the local item gradient value, and updating the item feature vector using the neighboring item gradient value, outputting, by the client device, recommendations of the items to the users based on the user preference vector and the item feature vector.

14. The computer-implemented system of claim 13, further comprising one or more instructions to:
receive, by the client device, a trigger to initiate a training process, the client device being configured to store score information of a user for an item, the user preference vector of the user, and the item feature vector, and being configured to implement matrix decomposition through a collaborative training.

15. The computer-implemented system of claim 13, wherein the neighboring client device comprises one or more client devices in a network.

16. The computer-implemented system of claim 13, wherein updating the item feature vector by using the neighboring item gradient value comprises:
updating the item feature vector by using all or a portion of a plurality of neighboring item gradient values.

17. The computer-implemented system of claim 13, wherein the neighboring client device that receives the local item gradient value and a neighboring client device that sends the neighboring item gradient value are in a same client set or in different client sets.

* * * * *